(12) United States Patent
Chamberlin

(10) Patent No.: US 8,272,800 B2
(45) Date of Patent: *Sep. 25, 2012

(54) WRITING INSTRUMENTS FOR SMALL CHILDREN

(76) Inventor: Kirk C. Chamberlin, Calabasas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/200,771

(22) Filed: Sep. 30, 2011

(65) Prior Publication Data

US 2012/0027498 A1  Feb. 2, 2012

Related U.S. Application Data

(63) Continuation of application No. 11/810,255, filed on Jun. 5, 2007, now Pat. No. 8,038,360.

(51) Int. Cl.
*B43K 25/00* (2006.01)
(52) U.S. Cl. ............... 401/52; 401/49; D19/42; D19/51
(58) Field of Classification Search .............. 401/52, 401/49, 88, 34, 35; D19/42, 51
See application file for complete search history.

(56) References Cited

U.S. PATENT DOCUMENTS 471,191 A * 3/1892 Prewitt .......................... 401/35
3,640,288 A * 2/1972 Spanel .......................... 132/212

* cited by examiner

*Primary Examiner* — David Walczak
(74) *Attorney, Agent, or Firm* — Thomas A. Turner, Jr.

(57) ABSTRACT

Crayons are formed of a unitary material with interior distances between surfaces to prevent insertion through the maximum mandibular opening of a child five years of age or younger.

2 Claims, 3 Drawing Sheets

WRITING INSTRUMENTS FOR SMALL CHILDREN

CONTINUATION APPLICATION AND CLAIM OF PRIORITY UNDER 35 U.S.C., §120

This application is a continuation application of application Ser. No. 11/810,255 filed Jun. 5, 2007 by the Applicant herein, now issued as United States Letters Patent No. 8,038, 360. Applicant herein claims all priority rights under Title 35 U.S.C., §120 et seq., for all matter disclosed in said application.

BACKGROUND OF THE INVENTION

1. Field of the Invention

The present invention relates to the art of writing instruments and more particularly to the art of crayons and like coloring devices suitable for small children.

2. Description of the Prior Art

In the past, one of the favorite and more universal devices for educating and entertaining small children has been a set of colored crayons. Such crayons are useful in aiding a small child, such as children five years of age and younger, in developing color recognition and color distinction, and in developing writing and drawing skills.

Typically, such crayons have been shaped not unlike typical writing instruments. In particular, such crayons are shaped in elongated, cylindrical shapes similar to the shapes of pencils and pens. Like pencils and pens, such crayons have had one end formed to a point, usually to aid the user in making finer lines on his or her drawing or writing. The length of the crayon, like the length of writing instruments in general, is usually long enough for a user to grip or hold the crayon, usually on the order of four to four and one-half inches, or ten to twelve centimeters (herein after "cm."}. However, the diameter of the cylindrical shaft of the crayon is usually not more than three-eights inch, or less than one cm., in diameter.

It may be well appreciated that children of the age of five years and younger, are given to exploring and sensing items by inserting them into their mouths. Often, items inserted by a child into his or her mouth is chewed, and even swallowed, all as part of this exploration and sensing activity.

The dimensions of typical crayons, as noted above, result in a shape easily broken by small children, critically, those children five years of age and younger. This ease of breaking is especially true where, as in the case of crayons, the material used for the crayon is a waxy material, or charcoal or clay. Herein after in this specification, the word "crayon" is used to mean a small device of waxy material, charcoal or clay used for drawing, coloring or writing. It may be white or colored.

It may be appreciated that when a crayon, or any writing instrument having a length of ten or twelve cm. and a diameter of only one cm. is broken into parts, one is left with a plurality of short, cylindrical shafts one cm. in diameter and lengths such that the broken parts can easily be assumed into a child's mouth, and sometimes more easily ingested down the child's throat, all with unwanted consequences.

Notwithstanding these undesired consequences of typical crayons, the benefits of crayons and like writing instruments for children five years and younger are highly desired.

Research has shown that there are maximum limits to the mandibular movements and openings in children. Agerberg reports that the mean value for mandibular movement, which defines the mouth openings, in children of seventeen to nineteen months of age, of 3.84 cm., with a maximum movement of is 4.4. cm. G. Agerberg, "Maximal Mandibular Movements in Children," *Acta. Odont. Scand.* 32, 147-159 (1974). The mean value of mandibular movement for children of six years 4.48 cm., with an extreme movement of 6 cm. Id.

Following on such research, Rothenberg conducted research on the mandibular opening in four to fourteen year old children, showing a mean opening value of approximately 4.4 cm. for all children ages four to fourteen L. H. Rothenberg, "*An Analysis of Maximum Mandibular Movements, Craniofacial Relationships and Temporomandibular Joint Awareness in Children,*" *The Angle Orthodontist*, v. 61, no. 2, 103-112, at 107-108 (1991). For children of age four, the maximal mandibular movement mean was less than 4 cm. For children of age five, the maximal mandibular movement mean was slightly over 4 cm. Id., at p. 107.

Heretofore, there has not been provided a crayon having a specification that will prevent insertion in a child's mouth or, worse, ingestion by a child, where the children are five years old or less.

Another problem is often experienced by very small children, the palms of whose hands often have substantial amounts of flesh relative to the size of the hand generally. Such a hand inherently has less dexterity. Moreover, the younger child has less or undeveloped motor skills, a characteristic which, when added to the fleshy, less dexterous hand, gives such a child great difficulty grasping a crayon having only a one cm. diameter. It is difficult for such a child to wrap his fingers around the shaft of such a crayon.

It is one object of this invention to provide a crayon that is easily grasped by small children with fleshed palms of his or her hands. It is a further object of this invention to provide a crayon that is more safe and is less likely to be taken or inserted into a child's mouth or to be ingested. It is yet another object of this invention to provide such crayons having educational devices incorporated within them to provide subtle educative suggestions to the young user.

SUMMARY

In brief, in accordance with one aspect of the present invention, a crayon fabricated of a single, solid material having a volumetric configuration sufficient to prevent insertion into the mouth of a small child such as a child of the age of five or younger. In one aspect of the invention, the crayon will have length distances interiorly from one surface to another in three mutually perpendicular dimensions of substantially five cm. in order to prevent insertion through the maximum mandibular opening of a child.

These and other novel aspects of the present invention, together with other aspects thereof, can be better understood by the following detailed description of the preferred embodiments, which are designed to be read in conjunction and together with the accompanying drawings.

DESCRIPTION OF THE PREFERRED EMBODIMENTS

Figure 1:
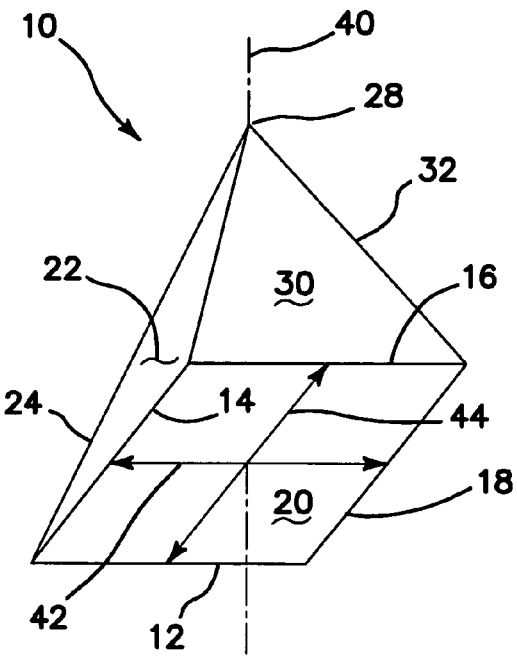
FIG. 1 is an angle or cabinet view of a crayon in accordance with a preferred embodiment of the present invention showing a inverted position of a generally pyramidal crayon.
Figure 2:
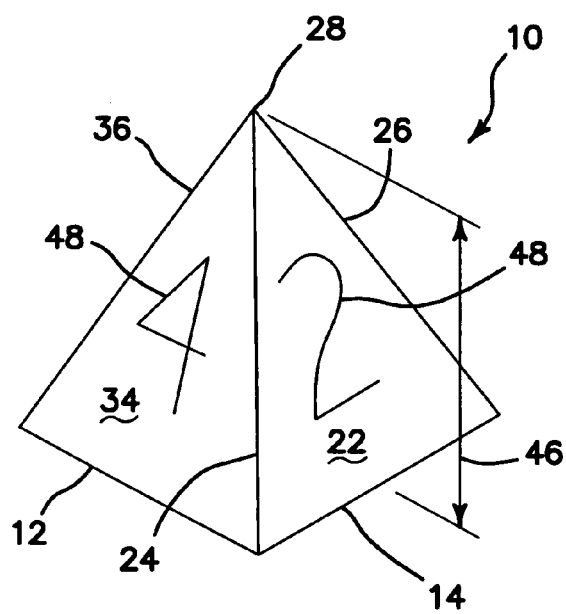
FIG. 2 is a front angle or cabinet view of the preferred embodiment of the present invention shown in FIG. 1, having the generally pyramidal crayon oriented in an upright position.

A crayon 10 is shown, reference being had initially to FIGS. 1 and 2 of the accompanying drawings where reference numerals refer to like reference numerals used herein. The crayon 10 comprises an integral, unitary, solid material having a generally base surface and four-sided pyramidal shape as shown in FIG. 1. The crayon 10 has a base surface 20 defined by base side lines 12, 14, 16, 18 defining the base surface 20. The crayon has a side 22 defined by the base side line 14 and corner line 24 and corner line 26, the corner lines 24, 26 reaching or culminating in a point or pyramid top 28. The crayon 10 has a second side 30 defined by base side line 16 and corner line 26 and corner line 32. The corner lines 26, 32 also reach or culminate in the pyramid peak or top 28.

The crayon 10 has a side 34, better seen in FIG. 2 of the drawings. FIG. 2 shows the crayon 10 of FIG. 1, but oriented in a generally right side up position, for clarity of view. Side 34 is defined by base line 12, corner line 24 and corner line 36. The corners defined by lines 24, 36 also culminate in the top 28.

A centerline 40 is shown from the top 28 to its nearest point on the base 20. The distance 46 identifies the shortest distance from the top 28 of the crayon 10 to its base surface 20. Perpendicular to the centerline 40 is a distance 42 defining the distance between base line 14 and base line 18. Perpendicular to both the centerline 40 and the distance 42 is the distance 44 between the base line 12 and the base line 16. The distances 42, 44 and 46 are substantially at least five cm. each. As one progresses upwardly toward the top 28 along the centerline 40, the mutually perpendicular distances comparable to distances 42, 44, will decrease. However, in accordance with this preferred embodiment, there should always been a point interior of the shape of the crayon 10, such that three mutually perpendicular lines connecting surfaces of the crayon 10 will have distances or lengths of substantially five cm. or more. The distance 46 in the preferred embodiment of FIGS. 1 and 2 can be extended to whatever length desired, but by virtue of the shape of the crayon 10 as defined herein, the crayon 10 will maintain the characteristic that will greatly inhibit, indeed will probably prevent insertion in, or ingestion through, the mouths of children of the age of five or less.

It may be appreciated that the cross-section of the substantially pyramidal shape decreases as one progresses upward toward the top 28 along the centerline 40 from the base 20. The perpendicular distances 42, 44 decrease accordingly and if the distance 46 is long enough without maintaining a substantial cross-section of the pyramidal shape, the cross-sectional area for a substantial length of the distance 46 may be small enough so that the so extended portion of the crayon 10 can be inserted into the mouth of the child. First, it may be noted that because the base 20 still exists in the form as defined herein, the entire crayon 10 generally can never be completely inserted or ingested. Second, to prevent such an undesired result from happening, the cross-section can be maintained wherein the distances 42, 44 are maintained at five cm. for a distance to within five cm. of the top 28, so that there is no protuberance of less than five cm. having a cross-sectional area having perpendicular cross lines of less than five cm. each.

It may be appreciated that the invention as thus described will be beneficial to children having very small hands that are not dexterous, and who cannot curl their fingers to grasp objects. Of further benefit to small children, the crayon 10 can have indicia 48 inscribed on the sides 22, 30, 34 as shown, or on other sides and the base 20. The indicia 48 may be letters of the alphabet, as shown in FIGS. 1 and 2, or may be designs or images of certain animals or objects, as may be desired.

Figure 3:
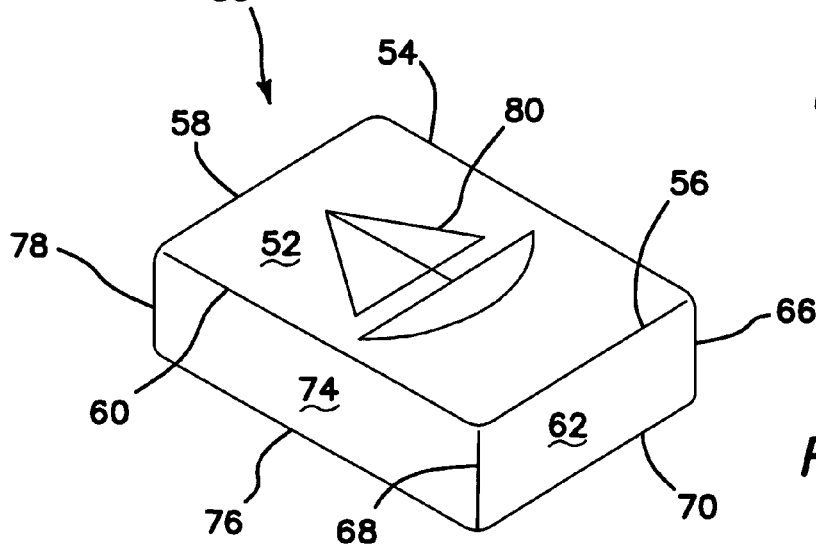
FIG. 3 is an angle or cabinet view of an alternative embodiment of the present invention having a six-sided crayon.

In FIG. 3, an alternative embodiment of the present invention is seen in a solid crayon 50 having generally six sides or surfaces in a generally block shape. The crayon 50 has a side 52 defined by edges 54, 56, 58, 60. Side 62 is defined by edges 56, 66, 68, 70. Side 74 is defined by edges 60, 68, 76, 78. If the distances of the edges 54, 56, 58, 60, 66, 68, 70, 76, 78 are at least substantially five cm., it will be very difficult, indeed likely impossible for a child of five years age or less to insert the crayon 50 into his or her mouth.

The embodiment of FIG. 3 also may have selected educational indicia, such as the design of an object 80 inscribed or formed on surface 52 as well as on other surfaces to provide educational suggestion and benefit to the child user, as described in the preferred embodiment of FIGS. 1 and 2, above.

Figure 4:
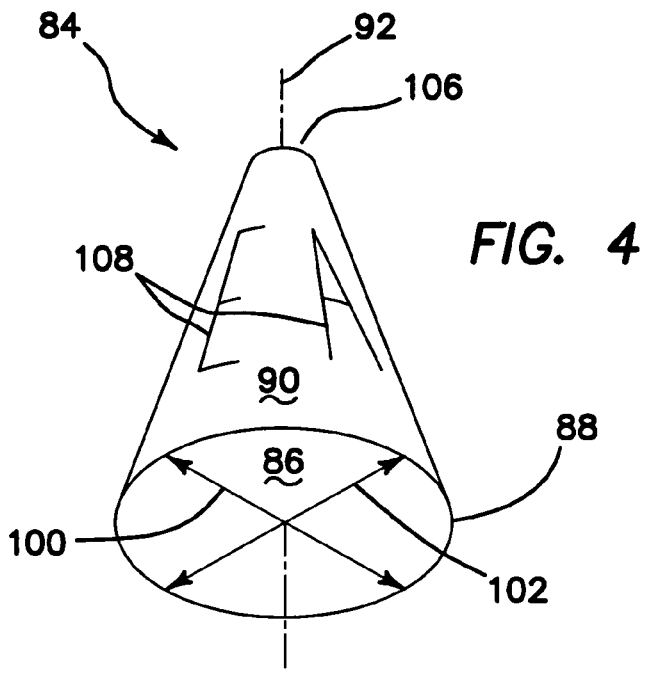
FIG. 4 is an angle or cabinet view of yet another alternative embodiment of the present invention showing a substantially conical configuration.
Figure 5:
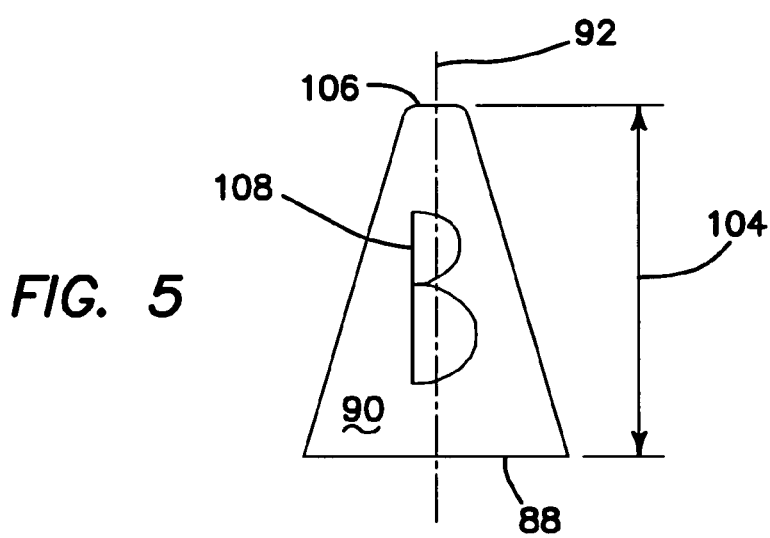
FIG. 5 is a front elevation view of the alternative embodiment of the present invention shown in FIG. 4.

In FIGS. 4 and 5, in yet another alternative embodiment, an integral, solid material crayon 84 comprises a generally circular base surface 86 defined by circumferential edge 88. The crayon 84 has a generally conical shape having a conical side 90 about centerline 92. Distance 100 is perpendicular to distance 102, the distances 100, 102 being substantially diameters of the base surface 86 and both are substantially perpendicular to the centerline 92. The distance 104 from the base surface 86 to the apex 106 of the crayon 84, as well as the distances 100, 102, will be at least five cm. The apex 106 has been rounded or shaved so as not to present a sharp point.

The side 90, as well as the base surface 86 may have educational or entertaining indicia 108 inscribed thereon, such as, e.g., letters of the alphabet 108, or objects for recognition or educational suggestion.

Figure 6:
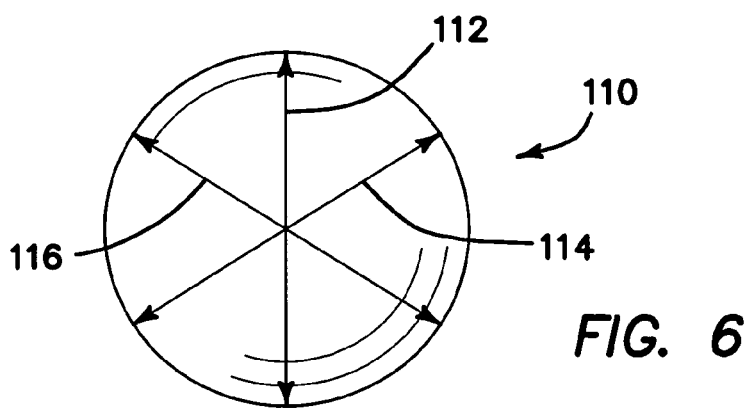
FIG. 6 is an elevation view of still another alternative embodiment of the present invention showing a generally spherical configuration.

In FIG. 6, an integral, solid crayon 110 is shown having a generally spherical shape. Three distance 112, 114, 116 are shown extending from a point on the surface of the crayon 110, interiorly to another point on the surface. The distance 112 intersects the distance 114 perpendicularly, and intersects the distance 116 perpendicularly. Likewise, distance 114 intersects distance 116 perpendicularly. If these distances 112, 114, 116 are made to be at least five cm., a child of five years or less will not likely be able to insert the crayon 110 into his mouth, and certainly will not be able to ingest the crayon 110.

Each of the distances 112, 114, 116 may be extended beyond five cm., resulting in oblong or substantially elliptical designs of various shapes. As long as there exists an intersection of three mutually perpendicular distances of at least five cm., with no unduly extended protuberance of cross-section having perpendicular cross-distances of less than five cm., the modified crayon 110 will be suitable for use by those children who are the objects of this invention.

As with all embodiments of the present invention, educational or entertaining indicia may be inscribed on the surface of the crayon 110, so as to provide educational benefit to the child user.

Figure 7:
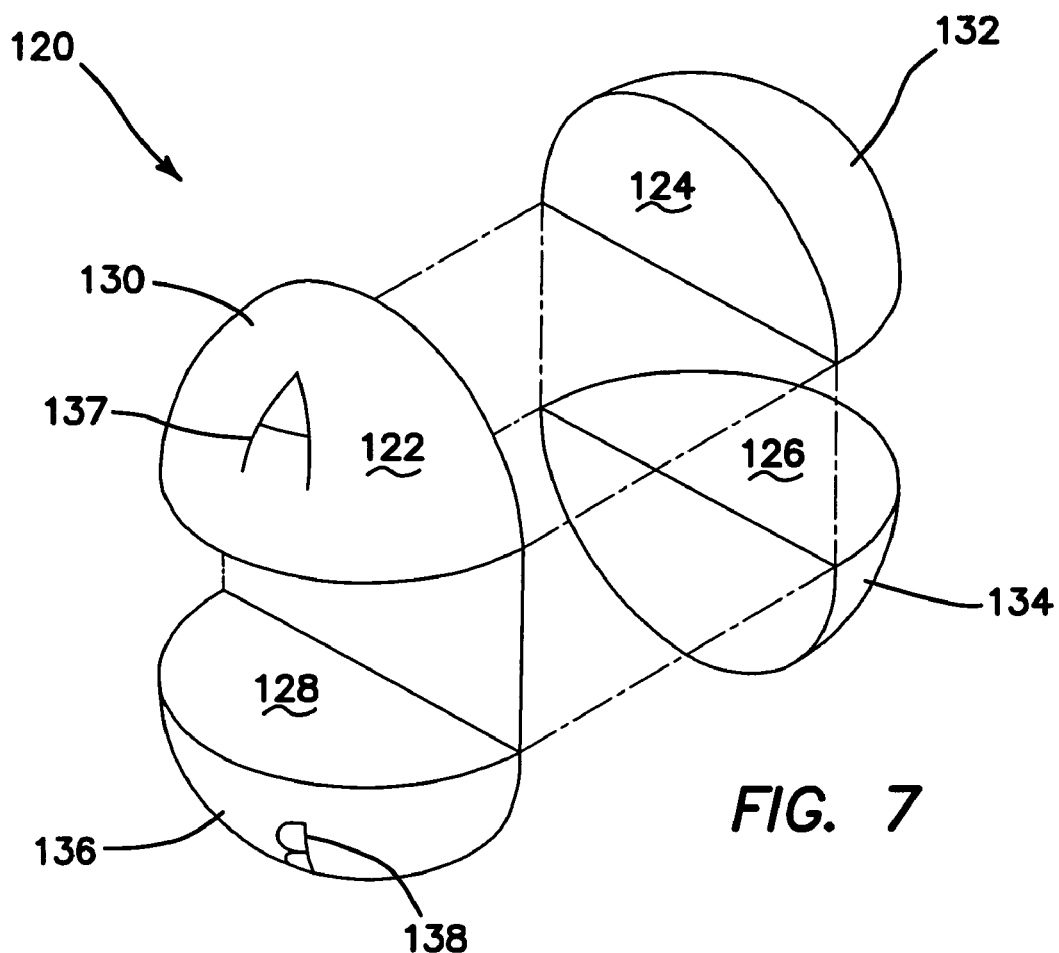
FIG. 7 is an exploded angle view of an alternative embodiment of the invention as shown in FIG. 6; and, FIG. 8 is an angle view of yet another alternative embodiment of the present invention showing a substantially rhomboidal configuration.

In FIG. 7, another alternative embodiment is shown comprising a spherical crayon 120 divided into four quadrants 122, 124, 126, 128. In the view of FIG. 7, the four quadrants 122, 124, 126, 128 are shown exploded apart from each other. When the quadrants are fused together to form the sphere 120, the quadrant 122 has an exposed surface 130. The quadrant 122 is formed having a distinct color different from the remaining quadrants 124, 126, 128, so that when the surface 130 is pressed along an object, such as a drawing sheet, not shown, the crayon 120 will impart to the object that distinctive color.

Similarly, the quadrant 124 has a distinct color different from the remaining quadrants 122, 126, 128. When the quadrants are fused together, quadrant 124 has an exposed surface 132 with that distinctive color and is capable of imparting that color to an object, such as, e.g., a drawing sheet. In like manner, quadrant 126 has an surface 134 which is exposed when the quadrants are fused together. The quadrant 126 has a distinct color different from the other quadrants 122, 124, 128. Like the other quadrants, quadrant 128 has a surface 136 exposed when the quadrants are positioned together forming the sphere 120. The color of quadrant may be different from the colors of the other quadrants 122, 124, 126. The surfaces 130, 136, and others as may be desired, have intelligible indicia 137, 138 to aid in letter, word or object recognition by user children.

When the quadrants 122, 124, 126, 128 are formed together to result in a sphere 120, the diameter of the sphere 120 should be at least five cm. Any variation of the generally spherical shape of the crayon 120 will have no protuberance having a cross-sectional plane wherein a line passing through the center of the protuberance will be less than five cm. at a point more than five cm. from the end of the protuberance. The mechanism for securing the quadrants 122, 124, 126, 128 together must be sufficient to withstand the forces a child can apply in an effort to separate the quadrants apart. Preferably, any element used to secure the quadrants 122, 124, 126, 128 together should not be toxic but digestible by infants and small children.

Figure 8:
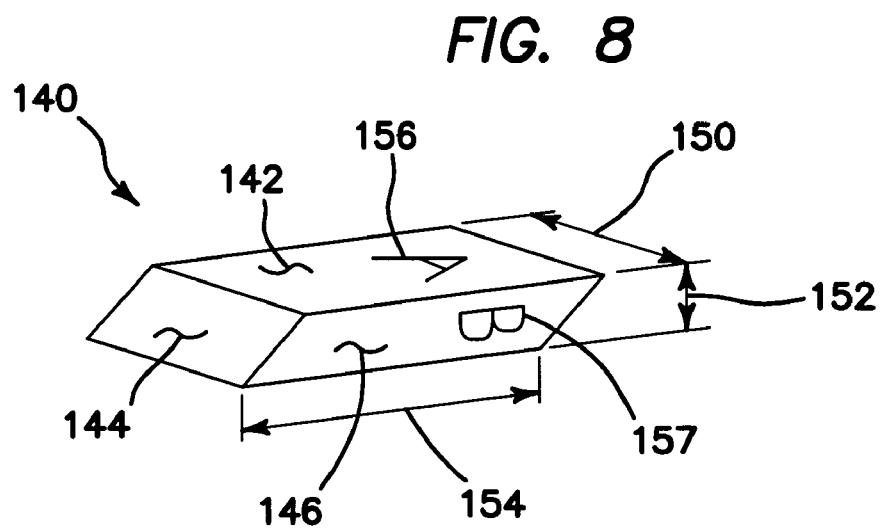

Another alternative embodiment of the present invention comprises a crayon 140 having a substantially rhomboidal shape as seen in FIG. 8 of the accompanying drawings. The substantially rhomboidal crayon 140 has sides 142, 144, 146 each with its complemental parallel side, not seen in this view. The line 150 represents the distance of the line of intersection between side 142 and side 144. The line 152 represents the distance of the height of the rhomboidal crayon 140 from side 142 to its parallel side, not shown in this view. The line 154 represents the distance of the intersection of side 142 with side 146. The lines 150, 152 and 154 are mutually orthogonal.

In accordance with the present invention, the shortest of the lines 150, 152, 154 is at least five cm., which will define a shape that will prevent insertion within the mouth of small child of the age of five or less.

As shown in FIG. 8, the crayon 140 has indicia 156 in the form of a letter of the alphabet formed on the side 142. Similarly, another indicia 157 is formed on side 146 of the crayon 140. Various other indicia suitable for imparting educational suggestion to a small child user may be used. Further, different indicia may be selected for different crayons in a series of such crayons 140 to form a coherent thought in a set.

Although the preferred and alternative embodiments of the present invention have been described in the geometric shapes and designs of a pyramid, block, cone, rhomboid and sphere, any geometric shape, such as, e.g. trapezoids, rhombuses, diamonds and the like would work to the same purpose and benefit.

The foregoing detailed description of my invention and of preferred and alternative embodiments to products, composition and processes, is illustrative of specific embodiments only. It is to be understood, however, that additional embodiments may be perceived by those skilled in the art. The embodiments described herein, together with those additional embodiments, are considered to be within the scope of the present invention.

I claim:

1. A crayon comprising in combination:
   a) a plurality of crayon sections, each of which sections having a color distinct from the color of each of the other of said plurality of crayon sections, wherein said sections are formed together to form a unitary crayon having a single and substantially smooth surface and a shape;
   b) a first distance along a first line as measured from one point on said surface interiorly of said crayon material to another point on said surface, of at least five cm.;
   c) a second distance along a second line as measured from a third point on said surface interiorly of said crayon material to a fourth point on said surface, of at least five cm., said second line intersecting said first line perpendicularly;
   d) a third distance along a third line as measured from a fifth point on said surface interiorly of said crayon material to a sixth point on said surface, of at least five cm., said third line intersecting said second line and said first line perpendicularly.

2. The Crayon of claim 1 wherein said substantially smooth surface comprises a spherical surface.

* * * * *